United States Patent
Lebas et al.

(10) Patent No.: US 12,516,716 B2
(45) Date of Patent: Jan. 6, 2026

(54) TRANSMISSION MECHANISM

(71) Applicant: VALEO EMBRAYAGES, Amiens (FR)

(72) Inventors: Gilles Lebas, Cergy Pontoise (FR); Emmanuel Commeine, Cergy Pontoise (FR); Elie Geffroy, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/632,395

(22) Filed: Apr. 11, 2024

(65) Prior Publication Data
US 2024/0344594 A1  Oct. 17, 2024

(30) Foreign Application Priority Data

Apr. 14, 2023 (FR) ..................... 23 03771

(51) Int. Cl.
*F16H 3/10* (2006.01)
*F16H 3/00* (2006.01)

(52) U.S. Cl.
CPC ............... *F16H 3/10* (2013.01); *F16H 3/006* (2013.01); *F16H 2200/0021* (2013.01); *F16H 2200/0034* (2013.01)

(58) Field of Classification Search
CPC .... F16H 3/10; F16H 3/006; F16H 2200/0021; F16H 2200/0034; F16H 3/089; F16H 2003/0818; F16H 37/08; F16H 57/023; F16H 2057/02043; F16H 2057/02086; B60K 2001/001; B60Y 2200/91; F16D 47/04; F16D 11/10; F16D 41/069; F16D 41/04; F16D 41/06

See application file for complete search history.

(56) References Cited

U.S. PATENT DOCUMENTS

| 4,711,332 A | 12/1987 | Schuster |
| 11,384,817 B2 * | 7/2022 | Park ................... B60K 17/16 |

FOREIGN PATENT DOCUMENTS

| DE | 38 01 351 A1 | 8/1989 |
| DE | 10 2015 120 818 A1 | 6/2017 |
| DE | 10 2015 121 138 A1 | 6/2017 |
| FR | 2 178 300 A5 | 11/1973 |

OTHER PUBLICATIONS

Preliminary French Search Report issued Nov. 10, 2023 in French Application 23 03771 filed on Apr. 14, 2023, 10 pages (with English Translation of Categories of Cited Documents & Written Opinion).

* cited by examiner

*Primary Examiner* — Victor L Macarthur
(74) *Attorney, Agent, or Firm* — Oblon, McClelland, Maier & Neustadt, L.L.P.

(57) ABSTRACT

A transmission mechanism for a gearbox includes a first shaft, a first driven wheel rotatably guided on the first shaft, a switching mechanism and a freewheel device. The freewheel device includes a locking member rotatably interacting with the first shaft and with the first driven wheel. The first driven wheel includes first teeth that rotatably interact with second teeth of the switching mechanism in a first engaged position and do not rotatably interact with the second teeth in a second disengaged position. The first teeth and the second teeth at least partially axially cover the locking member in the first engaged position.

20 Claims, 8 Drawing Sheets

TRANSMISSION MECHANISM

TECHNICAL FIELD OF THE INVENTION

The invention relates to a transmission mechanism intended to drive a motorized machine. The transmission mechanism may for example be a gearbox suitable for being associated with an electric motor. The motorized machine may for example be a motor vehicle, or a so-called commercial vehicle such as a heavy goods vehicle.

PRIOR ART

In such an application, a two-speed transmission system capable of changing gear without power interruption, in particular for an electric vehicle, is commonly sought.

WO 2022/0028561, for example, proposes a two-speed transmission system comprising:
- a freewheel mounted on an input shaft and coupled to a first gear;
- a multi-disc clutch mounted on the input shaft, having a hub;
- a second gear mounted freely on the input shaft and comprising external teeth suitable for engaging with the hub of the multi-disc clutch; and
- in which, when the first forward gear of the vehicle is selected, the freewheel is capable of rotating to drive the vehicle and the multi-disc clutch is in the disengaged position.

Such a system makes it possible to obtain, simply and cost-effectively, the possibility of changing gear by combining the intrinsic properties of the blocking and releasing of the freewheel as a function of the speed conditions applied to it, and the controlled management of the progressive transition from the engaged position to the disengaged position of the multi-disc clutch. In addition, this system also comprises a clutch device intended to short-circuit the freewheel in order to allow power transmission during the operating phases of the vehicle in reverse or in the deceleration phase when first gear is selected.

However, such a system has a number of drawbacks due to all of the components, in particular the freewheel and the multi-disc clutch, being mounted on the input shaft:
- the components all rotate directly at the speed of the motor, which may be very high, typically up to 20,000 rpm for electric motors, and has the effect of generating multiple problems relating to excessive mechanical stress or drag torque;
- the accumulation of the axial dimensions of the components on the same shaft results in a significant total footprint that may be incompatible with the available space allocated on the vehicle.

DISCLOSURE OF THE INVENTION

The invention aims to overcome these problems and achieves this, according to one aspect thereof, by proposing a transmission mechanism for a gearbox with a plurality of gears, the transmission mechanism comprising:
- a first shaft having a first axis of rotation;
- a first driven wheel, in particular in the form of a gear, coaxial with the first axis of rotation and rotatably guided on the first shaft, the first driven wheel comprising first teeth;
- a switching mechanism movable between at least a first engaged position and a second disengaged position, said switching mechanism comprising second teeth that rotatably interact with the first teeth in the first engaged position and do not rotatably interact with the first teeth in the second disengaged position;
- a freewheel device comprising a locking member rotatably interacting directly or indirectly with the first shaft, and rotatably interacting directly or indirectly with the first driven wheel;

the first teeth and the second teeth at least partially axially covering the locking member in the first engaged position.

Due to the axial superposing of the freewheel device by the teeth of the switching mechanism and the first driven wheel, it is possible to reduce the total axial length of the transmission mechanism in order to obtain a particularly compact structure.

Within the meaning of the present application:
- "axially" means "parallel to the axis of rotation of the first shaft";
- "radially" means "along an axis belonging to a plane orthogonal to the axis of rotation of the first shaft and intersecting this axis of rotation of the first shaft";
- "angularly" or "circumferentially" means "about the axis of rotation of the first shaft";
- the terms "outer" and "inner" are used to define the position of one component or component portion relative to another component or another component portion, by reference to the axis of rotation for which they are concentric; a component near said axis is thus described as inner as opposed to an outer component situated radially peripherally;
- "rigidly connected" means "rigidly coupled";
- a component is "rotatably guided" on or by another component when these two components are movable relative to each other only about a common axis of rotation, this type of connection also being referred to as a "pivot connection".

According to an additional feature of the invention, the locking member comprises a radially inner part that rotatably interacts, directly or via an inner ring, with the first shaft, and a radially outer part that rotatably interacts, directly or via an outer ring, with the first driven wheel.

This last feature makes it possible to improve the mechanical strength of the freewheel as the locking member is driven via its radially inner part, and the tangential friction velocities applied to the locking member are thus less significant than if the freewheel was driven via its radially outer part.

This last feature also makes it possible to simplify the structure and assembly of the switching mechanism as the freewheel is not assembled or in contact with the switching mechanism.

According to an additional feature, the driven wheel comprises an extension portion extending axially, the extension portion comprising a radially inner surface for rotatably interacting with the radially outer part of the locking member, and a radially outer surface bearing the first teeth.

According to an additional feature of the invention, the first teeth and the second teeth axially cover 20 to 100% of the axial length of the locking member in the first engaged position, and preferably the first teeth and the second teeth axially cover 40 to 100% of the axial length of the locking member in the first engaged position.

The improvement of this axial coverage thus makes it possible not only to increase the compactness, but also to reduce the mechanical stresses by means of better and more even distribution of the load during the transmission of torque between the first teeth and the second teeth.

According to an additional feature of the invention, the switching mechanism is a dog clutch, the second teeth being able to be inserted axially by cooperation of shapes into the first teeth during the transition from the second disengaged position to the first engaged position.

The dog clutch has the advantage of comprising few components, which provides a robust, compact and cost-effective solution.

According to an additional feature of the invention, the locking member comprises in particular a set of rollers or sprags or pawls.

According to an additional feature of the invention, the transmission mechanism further comprises:
- a second driven wheel coaxial with the first axis of rotation and rotatably fixed on the first shaft;
- a second shaft having a second axis of rotation parallel to the first axis of rotation;
- a third driven wheel coaxial with the second axis of rotation, rotatably fixed on the second shaft and rotatably interacting with the first driven wheel to form a first speed reduction ratio between the first shaft and the second shaft;
- a fourth driven wheel coaxial with the second axis of rotation, rotatably guided on the second shaft and rotatably interacting with the second driven wheel to form a second speed reduction ratio between the first shaft and the second shaft; and
- a friction clutch coaxial with the second axis of rotation, the friction clutch being capable of rotatably coupling and uncoupling the fourth driven wheel and the second shaft.

This last feature of the invention has the advantage of proposing a particularly compact architecture of a two-speed transmission mechanism. As the friction clutch is not positioned on the same axis as the freewheel device and the switching mechanism, it becomes possible to advantageously select relative axial and radial positions of each component borne by the first shaft and by the second shaft in order to reduce the total space occupied by the transmission mechanism. For example, the friction clutch may advantageously be axially positioned on one side or the other of the fourth driven wheel so that it is situated axially facing an axial space left free by the components borne by the first shaft. Likewise, the assembly formed by the switching mechanism and the freewheel device may advantageously be axially positioned on one side or the other of the first driven wheel so that they are situated axially facing an axial space left free by the components borne by the second shaft.

The friction clutch allows progressive transmission of the torque during the engagement and disengagement phases and therefore makes it possible to promote gear changes of the vehicle without power interruption.

According to an additional feature of the invention, the friction clutch comprises a plurality of friction discs.

The use of a plurality of friction discs makes it possible to increase the transmissible torque by increasing the number of faces in contact, and thus makes possible the use of a clutch with a small diameter.

According to an additional feature of the invention, the first speed reduction ratio is greater than the second speed reduction ratio.

The first speed reduction ratio may for example be selected to allow the starting of the vehicle on a slope, during which a significant torque value at the wheel is necessary.

The second speed reduction ratio may for example be selected to obtain a maximum speed of the vehicle that is sufficient on the motorway.

According to an additional feature of the invention, the first speed reduction ratio is between three and four.

According to an additional feature of the invention, the second speed reduction ratio is between 1.5 and 2.5.

According to a first embodiment of the invention, the transmission mechanism may further comprise:
- a fifth driven wheel rotatably fixed on the second shaft;
- a third axis of rotation parallel to the second axis of rotation;
- a sixth driven wheel coaxial with the third axis of rotation and rotatably interacting with the fifth driven wheel to form a third speed reduction ratio; and
- a differential mechanism fixed on the sixth driven wheel.

This first embodiment of the invention has the benefit of being able to add a third reduction ratio necessary to reach the wheel torque and speed ranges suitable for the use and driveability of the vehicle.

According to an additional feature of the invention, the third speed reduction ratio is between three and four.

The combination of the first speed reduction ratio and the third speed reduction ratio gives a total reduction ratio of nine to 16.

The combination of the second speed reduction ratio and the third speed reduction ratio gives a total reduction ratio of 4.5 to 10.

According to an additional feature of the first embodiment of the invention, the first shaft is capable of being rotated by an output shaft of an electric drive machine.

According to a second embodiment of the invention, the transmission mechanism may further comprise:
- a fifth driven wheel rotatably fixed on the first shaft;
- a third axis of rotation parallel to the second axis of rotation;
- a sixth driven wheel coaxial with the third axis of rotation and rotatably interacting with the fifth driven wheel to form a third speed reduction ratio; and
- a differential mechanism fixed on the sixth driven wheel.

According to an additional feature of the second embodiment of the invention, the second shaft is capable of being rotated by an output shaft of an electric drive machine.

According to an additional feature of the invention, the first driven wheel and the third driven wheel are gears, and/or the second driven wheel and the fourth driven wheel are gears, and/or the fifth driven wheel and the sixth driven wheel are gears.

The gears make it possible to ensure that the torque is transmitted quietly and with a satisfactory degree of efficiency due to the low friction losses.

The transmission mechanism of the invention may have one or another of the features described below, in combination with each other or taken independently of each other:
- the first driven wheel is rotatably guided on the shaft by guide means such as a needle bearing, a ball bearing or a plain bearing;
- the fourth driven wheel is rotatably guided on the second shaft by guide means such as a needle bearing, a ball bearing or a plain bearing;
- the switching mechanism is mechanically connected to the first shaft by means of a spline allowing axial sliding from a disengaged position to an engaged position;
- the switching mechanism and the friction clutch may each interact with an actuator to transmit the movement necessary for the transition from a disengaged position to an engaged position, the actuator being for example electromechanical or electromagnetic or hydraulic;

a single actuator may each interact with the switching mechanism and the friction clutch to transmit, in a coordinated manner, the movement necessary for the transition from a disengaged position to an engaged position, the actuator being for example electromechanical or electromagnetic or hydraulic;

the teeth of the dog clutch and the teeth of the first driven wheel may comprise end chamfers making it possible to promote progressive engagement without shocks during the coupling phases;

the freewheel device comprises an inner ring, an outer ring and a locking member comprising blocking elements positioned between the inner ring and the outer ring;

the freewheel device is mounted so that it is either in the "blocked" state in which the inner ring is driving to rotate the outer ring, or in the "free wheel" state in which the outer ring is driving and does not rotate the inner ring;

the freewheel device may not comprise inner and outer rings. In this case, the blocking elements of the locking member may for example be connected by a cage;

the freewheel device may comprise an actuation system making it possible to ensure the controlled closing of the freewheel;

the friction clutch may contain a row of inner discs borne by a first support and a row of outer discs borne by a second support. In the engaged position, the inner discs and the outer discs are rigidly connected, and in the disengaged position, the inner discs and the outer discs are disconnected;

the second support of the friction clutch is mechanically connected to the second shaft by means of a spline allowing axial sliding from a disengaged position to an engaged position;

the teeth of the gears may be helical;

the first driven wheel and the third driven wheel, and/or the second driven wheel and the fourth driven wheel, and/or the fifth driven wheel and the sixth driven wheel, may be pulleys rotated by belts;

the first driven wheel and the third driven wheel, and/or the second driven wheel and the fourth driven wheel, and/or the fifth driven wheel and the sixth driven wheel, may be toothed wheels rotated by chains;

the differential mechanism may form the output member of the gearbox, the differential mechanism driving two output half-shafts potentially rotating at different speeds and each connected directly or indirectly to a wheel of the vehicle.

According to another aspect thereof, the invention relates to a two-speed gearbox for a vehicle interacting with an electric drive machine and comprising the transmission mechanism described above.

Due to this gearbox architecture, a number of operations may be possible:

when the first forward gear of the gearbox is engaged, the switching mechanism may be in the engaged position or the disengaged position, and the friction clutch is in the disengaged position;

when the first reverse gear of the gearbox is engaged, the switching mechanism is in the engaged position, and the friction clutch is in the disengaged position;

when the second forward gear of the gearbox is engaged, the switching mechanism is in the disengaged position, and the friction clutch is in the engaged position;

the switching mechanism and the friction clutch are controlled in a coordinated manner to perform all of the gear changes;

when the vehicle is stopped, the simultaneous engagement of the switching mechanism and the friction clutch makes it possible to produce a parking brake.

According to another aspect thereof, the invention relates to a powertrain comprising a gearbox as described above and an electric drive machine.

Further features and advantages of the invention are revealed by the following description of non-limiting exemplary embodiments of the various aspects of the invention.

BRIEF DESCRIPTION OF THE FIGURES

For greater clarity, functionally identical or similar elements are identified using identical reference signs in all of the figures.

The elements of the description already explained will not be systematically repeated, and only the specific features of the different embodiments and examples will be set out in detail.

DETAILED DESCRIPTION OF THE EMBODIMENTS

Figure 1:
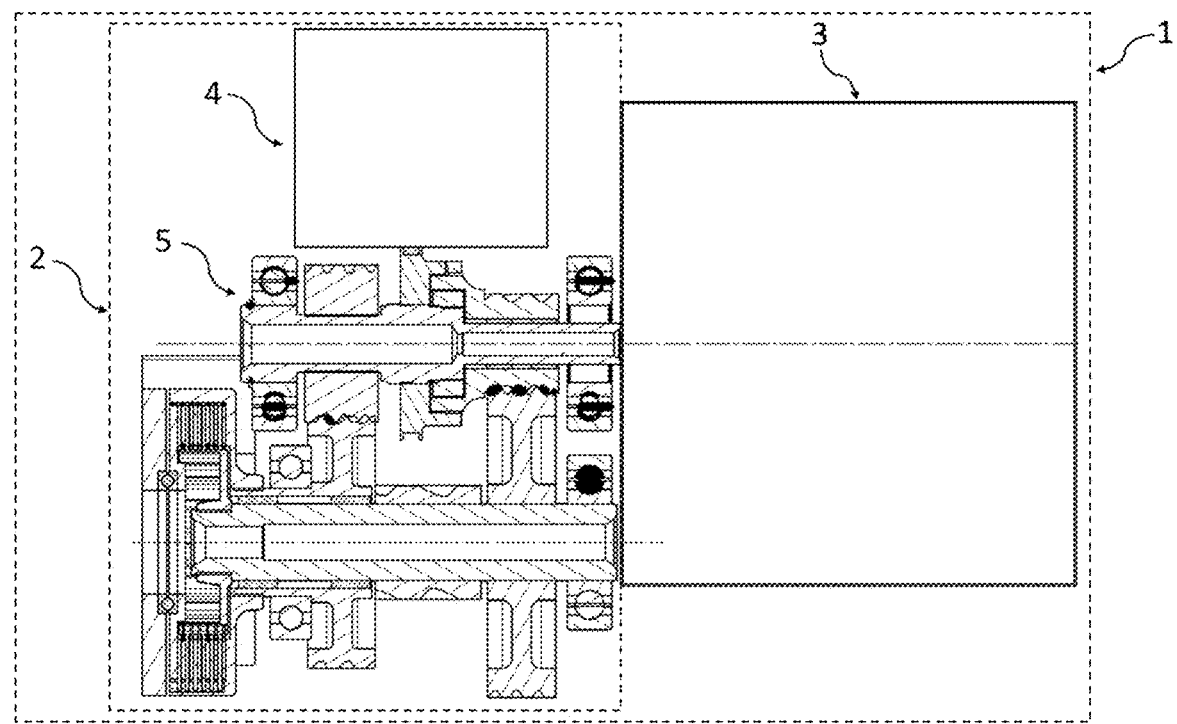
FIG. 1 illustrates a partial schematic cross-sectional view of a powertrain comprising a gearbox comprising a transmission mechanism according to a first embodiment of the invention.

FIG. 1 illustrates a powertrain 1 comprising an electric drive machine 3 and a gearbox 2 comprising a transmission mechanism 5 according to a first embodiment.

The electric drive machine 3 may in particular comprise an electric motor and power electronics systems making it possible to control the electric motor such as an inverter for example.

The electric drive machine 3 may comprise, at its output, a rotor shaft intended to directly or indirectly rotate an input shaft of the gearbox 2.

The gearbox 2 comprises a housing, not shown, that may be rigidly connected to the electric drive machine 3. The housing may contain the transmission mechanism 5.

Figure 2:
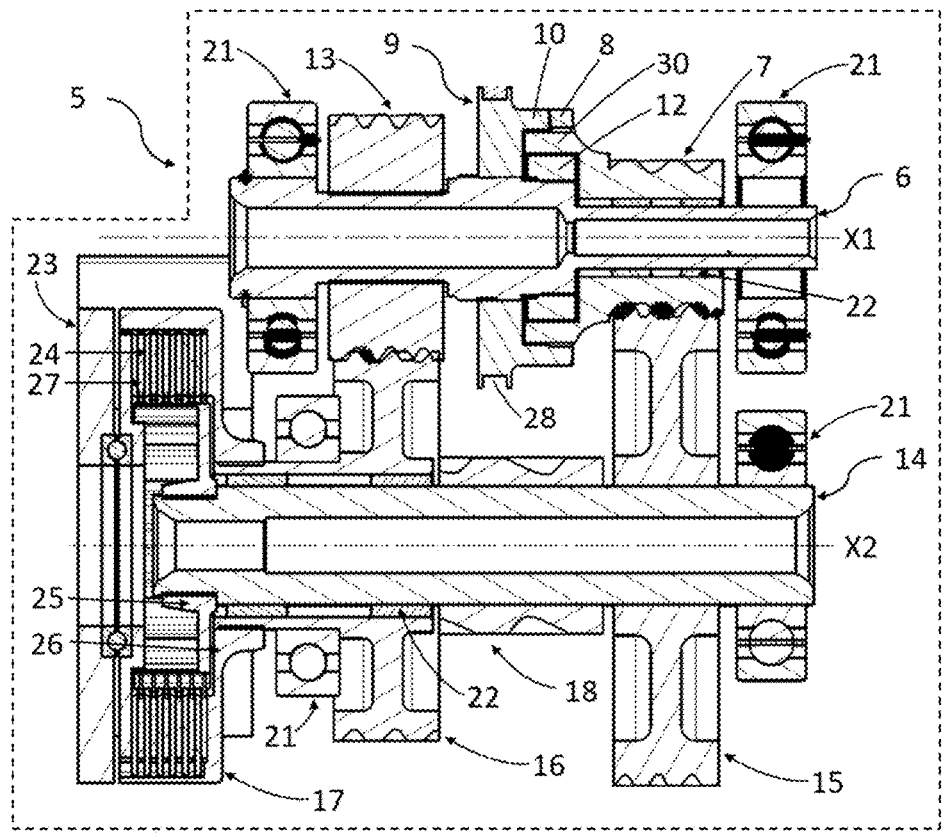
FIG. 2 is a partial schematic cross-sectional view of the transmission mechanism according to the first embodiment of the invention.

FIG. 2 illustrates the transmission mechanism 5 of the gearbox 2. The transmission mechanism 5 comprises:
- a first shaft 6 having a first axis of rotation X1;
- a first driven wheel 7, which here is in the form of a gear, coaxial with the first axis of rotation X1 and rotatably guided on the first shaft 6, the first driven wheel 7 comprising first teeth 8;
- a switching mechanism 9 movable between at least a first engaged position and a second disengaged position, said switching mechanism 9 comprising second teeth 10 that rotatably interact with the first teeth 8 in the first engaged position and do not rotatably interact with the first teeth 8 in the second disengaged position; and
- a freewheel device 11 comprising a locking member 12 rotatably interacting directly or indirectly with the first shaft 6, and rotatably interacting directly or indirectly with the first driven wheel 7.

The switching mechanism 9 is for example a dog clutch which, when actuated by a first actuator 4, translates axially in the direction of the axis of rotation X1. As illustrated in greater detail in FIG. 3, the mechanical connection between the first actuator 4 and the dog clutch 9 may be produced by a groove 28 arranged on the outer rim of the dog clutch 9 translatably interacting with an actuation lug arranged at the output of the first actuator 4. The mechanical connection between the dog clutch 9 and the first shaft 6 may be a spline allowing axial sliding from a disengaged position to an engaged position; The second teeth 10 of the dog clutch 9 and the first teeth 8 of the first driven wheel 7 may comprise end chamfers.

The housing may rigidly support actuators able to control the coupling and uncoupling of the switching mechanism 9 or of the friction clutch 17 visible in FIG. 2. These actuators may be electromechanical or electromagnetic or hydraulic.

Figure 4:
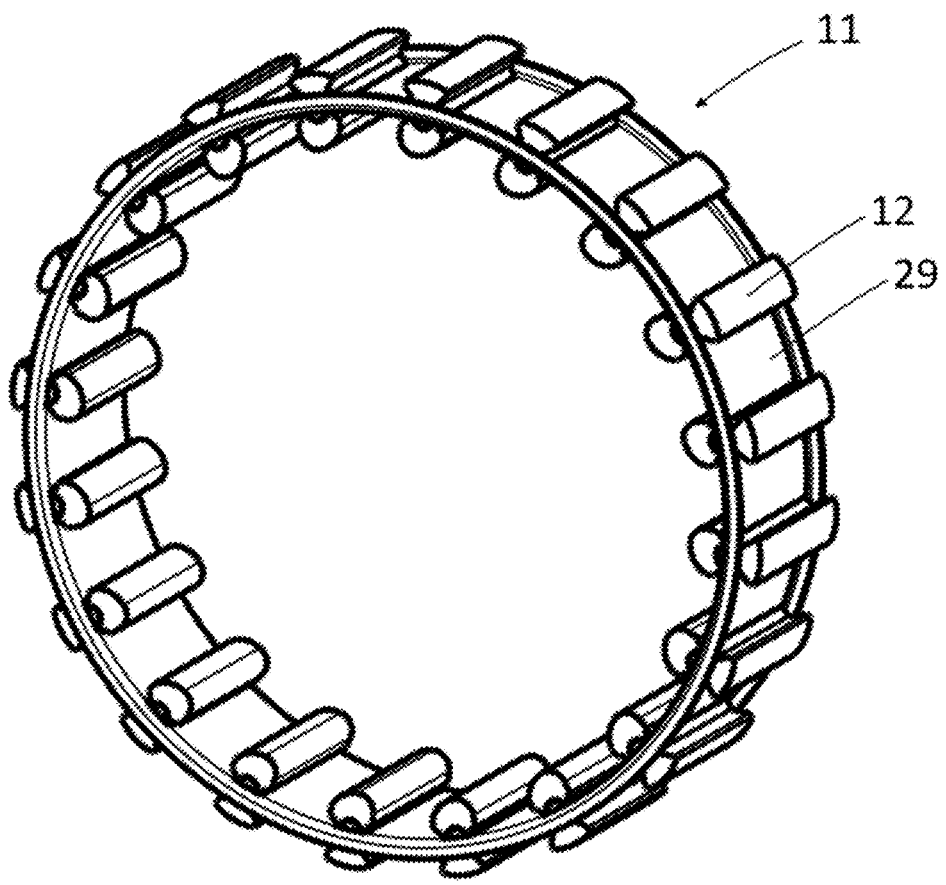
FIG. 4 illustrates a partial schematic perspective view of a freewheel device of the transmission mechanism according to the first embodiment of the invention.

The locking member 12 of the freewheel device 11 may for example be a plurality of sprags or rollers or pawls. FIG. 4 illustrates an example of the freewheel device 11, in which the locking member 12 is a plurality of sprags that may be connected to each other by a cage 29. A radially inner part of the sprags rotatably interacts directly with the first shaft 6 and a radially outer part of the sprags interacts directly with the first driven wheel 7.

The driven wheel 7 may comprise an extension portion 30 extending axially, the extension portion 30 comprising a radially inner surface for rotatably interacting with the radially outer part of the locking member 12, and a radially outer surface bearing the first teeth 8.

Figure 16:
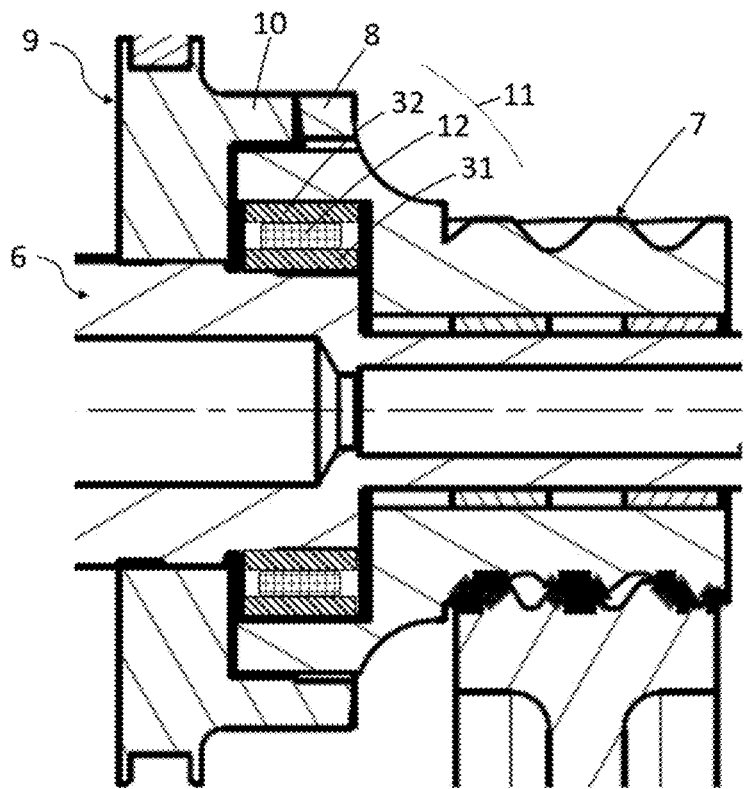
FIG. 16 is a partial schematic cross-sectional view of the transmission mechanism according to a tenth embodiment of the invention.

FIG. 16 illustrates another embodiment of the freewheel device 11. The locking member 12 may be inserted between an inner ring 31 rotatably connected to the first shaft 6 and an outer ring 32 rotatably connected to the first driven wheel 7. The freewheel device 11 may for example be fastened via a push-fitting or welding process.

The transmission mechanism 5 may further comprise:
- a second driven wheel 13 coaxial with the first axis of rotation X1 and rotatably fixed on the first shaft 6;
- a second shaft 14 having a second axis of rotation X2 parallel to the first axis of rotation X1;
- a third driven wheel 15 coaxial with the second axis of rotation X2, rotatably fixed on the second shaft 14 and rotatably interacting with the first driven wheel 7 to form a first speed reduction ratio R1 between the first shaft 6 and the second shaft 14;
- a fourth driven wheel 16 coaxial with the second axis of rotation X2, rotatably guided on the second shaft 14 and rotatably interacting with the second driven wheel 13 to form a second speed reduction ratio R2 between the first shaft 6 and the second shaft 14; and
- a friction clutch 17 coaxial with the second axis of rotation X2, the friction clutch 17 being capable of rotatably coupling and uncoupling the fourth driven wheel 16 and the second shaft 14.

The friction clutch 17 shown in FIG. 2 is for example a wet multi-disc clutch. Alternatively, the friction clutch 17 is a dry multi-disc clutch outside the gearbox 2, or a wet or dry clutch with a single friction disc. The friction clutch 17 contains a row of inner discs 24 borne by a first support 25 and a row of outer discs 27 borne by a second support 26. In the engaged position, the inner discs 24 and the outer discs 27 are rigidly connected, and in the disengaged position, the inner discs 24 and the outer discs 27 are disconnected. For example, the second support 26 of the friction clutch 17 is mechanically connected to the second shaft 14 by means of a spline allowing axial sliding from a disengaged position to an engaged position. The friction clutch 17 is actuated by means of the axial movement transmitted by a second actuator 23, partially shown.

The switching mechanism 9 and the friction clutch 17 may be controlled in a coordinated manner to progressively perform all of the gear changes.

Figure 3:
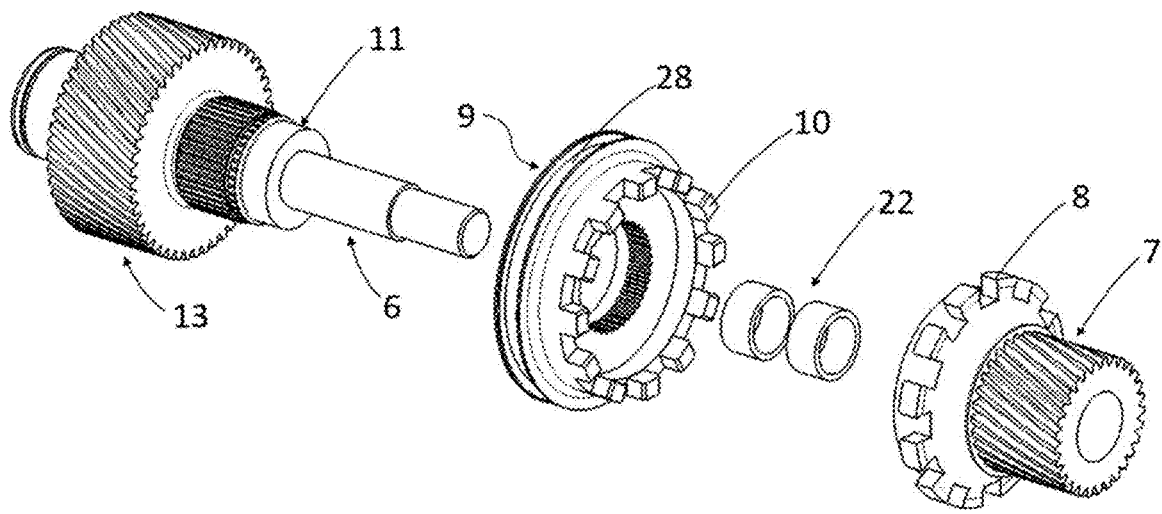
FIG. 3 illustrates an exploded partial schematic perspective view of the transmission mechanism according to the first embodiment of the invention.

In the embodiment illustrated in FIGS. 1, 2 and 3, the transmission mechanism 5 may further have the following features:
- the axis of rotation X1 is coaxial with the axis of rotation of the rotor shaft of the electric drive machine 3;
- the first shaft 6 and the second shaft 14 are rotatably guided relative to the housing of the gearbox 2 by means of bearings 21; the bearings 21 may be ball bearings or tapered roller bearings or parallel roller bearings;
- the first driven wheel 7 is rotatably guided on the first shaft 6 by guide means 22 such as for example a needle bearing, a ball bearing or a plain bearing; these guide means allow the first driven wheel 7 to rotate freely without power transmission when the first teeth 8 are not driven by the second teeth 10 of the switching mechanism 9;
- the fourth driven wheel 16 is rotatably guided on the second shaft 14 by guide means 22 such as for example a needle bearing, a ball bearing or a plain bearing; these guide means allow the fourth driven wheel 16 to rotate freely without power transmission when the friction clutch 17 is in the disengaged position.

Figure 5:
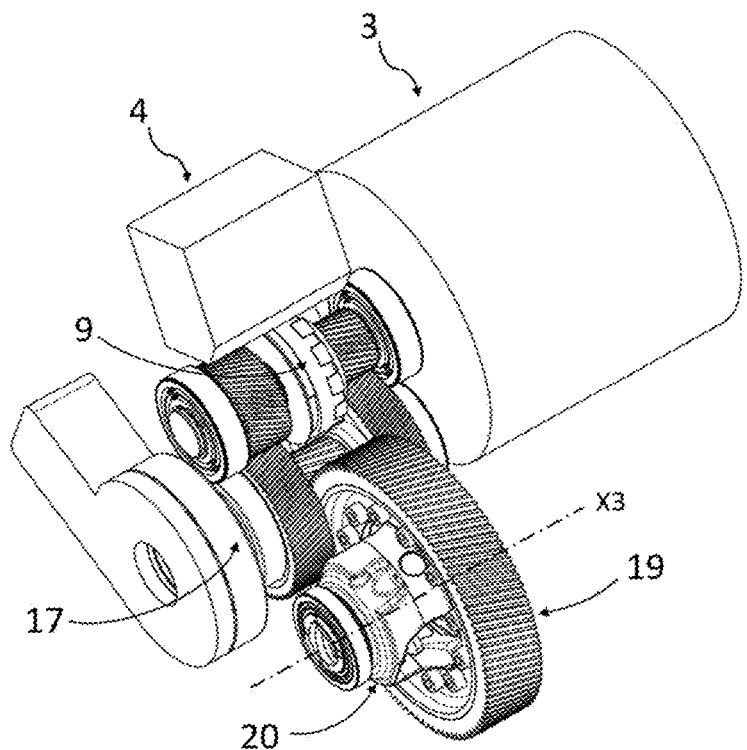
FIG. 5 illustrates a partial schematic perspective view of the powertrain in FIG. 1 according to the first embodiment of the invention.

As illustrated in FIG. 5, the transmission mechanism 5 may further comprise:
- a fifth driven wheel 18 rotatably fixed on the second shaft 14;
- a third axis of rotation X3 parallel to the second axis of rotation X2;
- a sixth driven wheel 19 coaxial with the third axis of rotation X3 and rotatably interacting with the fifth driven wheel 18 to form a third speed reduction ratio R3; and
- a differential mechanism 20 fixed on the sixth driven wheel 19.

The differential mechanism 20 may form the output member of the gearbox 2. As is known, the differential mechanism may drive two output half-shafts (not shown) potentially rotating at different speeds and each connected directly or indirectly to a wheel of the vehicle.

In FIGS. 1, 2, 3 and 5, in order to produce the rotating interaction corresponding to the reduction ratios R1, R2 and R3, all of the driven wheels may be helical gears. Other embodiments not shown are possible, in particular using straight gears, or using pulleys driven by belts, or using toothed wheels driven by chains.

In the first embodiment illustrated in FIG. 1, the first shaft 6 is rotated by an output shaft of the electric drive machine 3.

Figure 6:
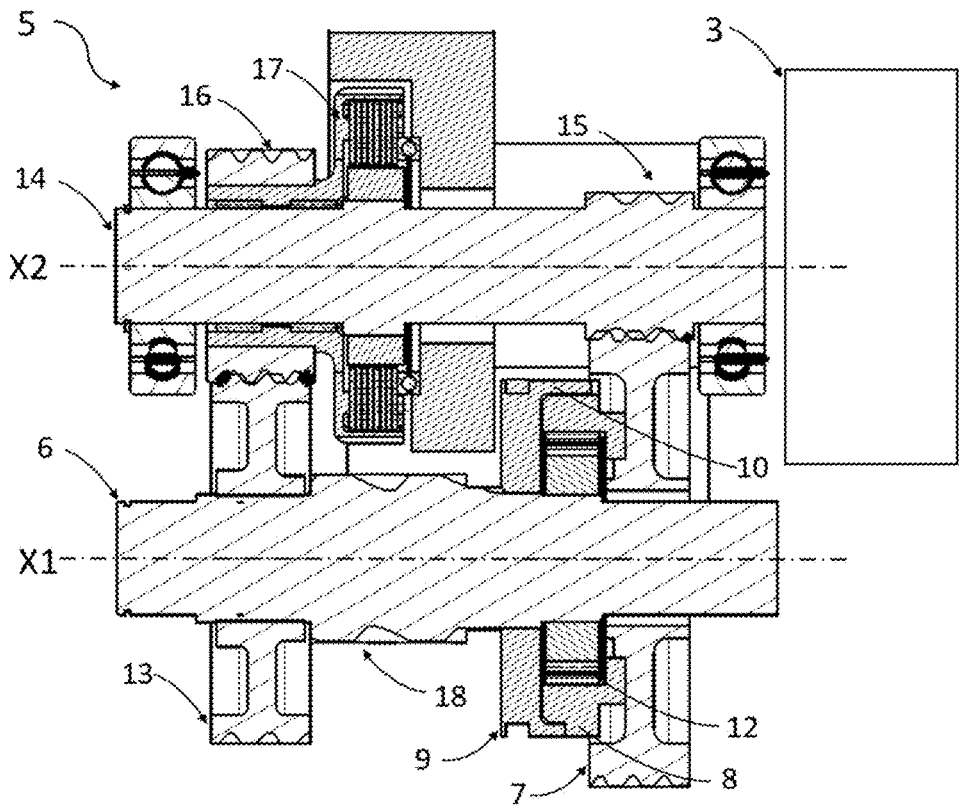
FIG. 6 illustrates a partial schematic cross-sectional view of a powertrain comprising a transmission mechanism according to a second embodiment of the invention.

The embodiment shown in FIG. 6 is a second embodiment of the invention that differs from the first in that here, it is the second shaft 14 that is rotated by an output shaft of the electric drive machine 3. In this case, the fifth driven wheel 18 is rotatably fixed on the first shaft 6 in order to rotatably interact with the sixth driven wheel 19 fixed to the differential 20.

FIGS. 7 to 15 schematically and non-limitingly show a plurality of possible positions of the components of the kinematic chain of the transmission mechanism 5. The different embodiments show how the invention makes it possible to select relative axial and radial positions of each component borne by the first shaft 6 and by the second shaft 14 in order to reduce the total space occupied by the transmission mechanism 5.

In the description of FIGS. 7 to 15 below, the positioning of the driven wheels is defined as follows:
"on the right" means "situated axially on the nearest side of the electric drive machine 3";
"on the left" means "situated axially on the furthest side of the electric drive machine 3".

In the description of FIGS. 7 to 15 below, the positioning of the switching mechanism 9 and the freewheel device 11 is defined as follows:
"right-hand side" means "situated axially in the position in immediate proximity to the first driven wheel 7 and on the nearest side of the electric drive machine 3";
"left-hand side" means "situated axially in the position in immediate proximity to the first driven wheel 7 and on the furthest side of the electric drive machine 3".

In the description of FIGS. 7 to 15 below, the positioning of the friction clutch 17 is defined as follows:
"right-hand side" means "situated axially in the position in immediate proximity to the fourth driven wheel 16 and on the nearest side of the electric drive machine 3";
"left-hand side" means "situated axially in the position in immediate proximity to the fourth driven wheel 16 and on the furthest side of the electric drive machine 3".

Figure 7:
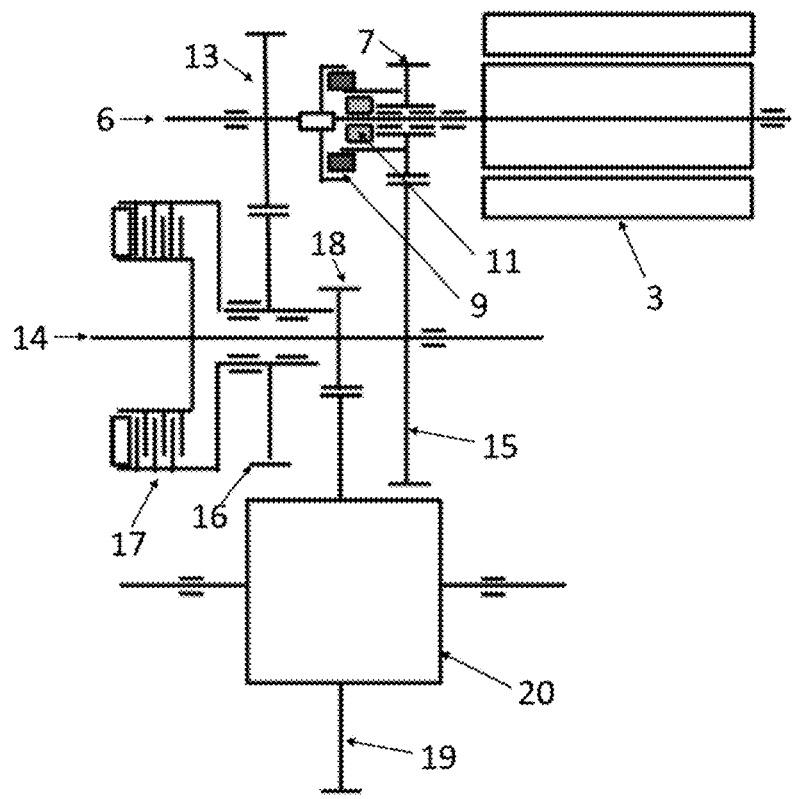
FIG. 7 illustrates a schematic depiction of the kinematic chain of the transmission mechanism according to the first embodiment of the invention.

In the first embodiment, illustrated in FIG. 7:
the first shaft 6 is rotated by the output shaft of an electric drive machine 3;
the first driven wheel 7 and the third driven wheel 15 are situated on the right;
the second driven wheel 13 and the fourth driven wheel 16 are situated on the left;
the fifth driven wheel 18 is situated axially between the third driven wheel 15 and the fourth driven wheel 16;
the switching mechanism 9 and the freewheel device 11 are situated on the left-hand side;
the friction clutch 17 is situated on the left-hand side.

Figure 8:
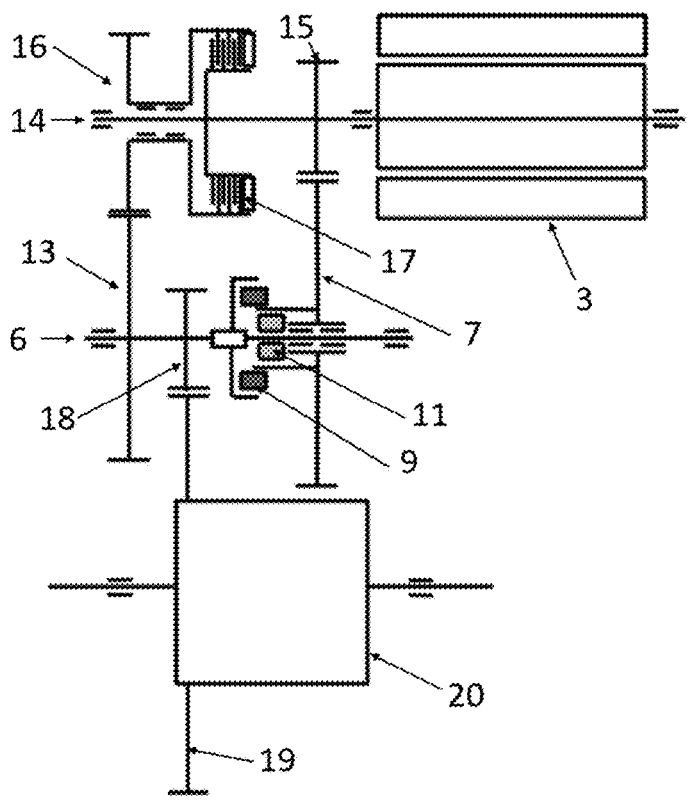
FIG. 8 illustrates a schematic depiction of the kinematic chain of the transmission mechanism according to the second embodiment of the invention.

In the second embodiment, illustrated in FIG. 8:
the second shaft 14 is rotated by the output shaft of an electric drive machine 3;
the first driven wheel 7 and the third driven wheel 15 are situated on the right;
the second driven wheel 13 and the fourth driven wheel 16 are situated on the left;
the fifth driven wheel 18 is situated axially between the first driven wheel 7 and the second driven wheel 13;
the switching mechanism 9 and the freewheel device 11 are situated on the left-hand side;
the friction clutch 17 is situated on the right-hand side.

Figure 9:
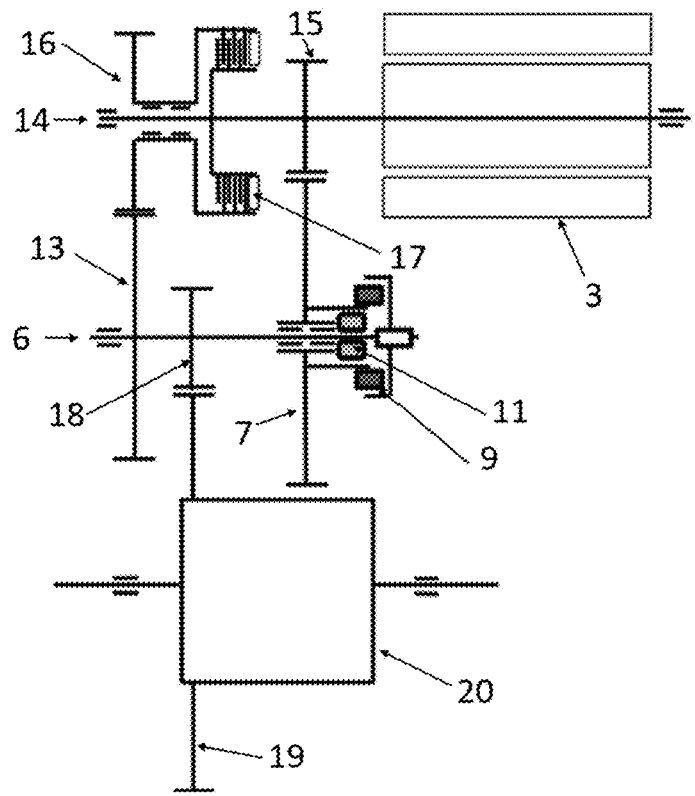
FIG. 9 illustrates a schematic depiction of the kinematic chain of the transmission mechanism according to a third embodiment of the invention.

In the third embodiment, illustrated in FIG. 9:
the second shaft 14 is rotated by the output shaft of an electric drive machine 3;
the first driven wheel 7 and the third driven wheel 15 are situated on the right;
the second driven wheel 13 and the fourth driven wheel 16 are situated on the left;
the fifth driven wheel 18 is situated axially between the first driven wheel 7 and the second driven wheel 13;
the switching mechanism 9 and the freewheel device 11 are situated on the right-hand side;
the friction clutch 17 is situated on the right-hand side.

Figure 10:
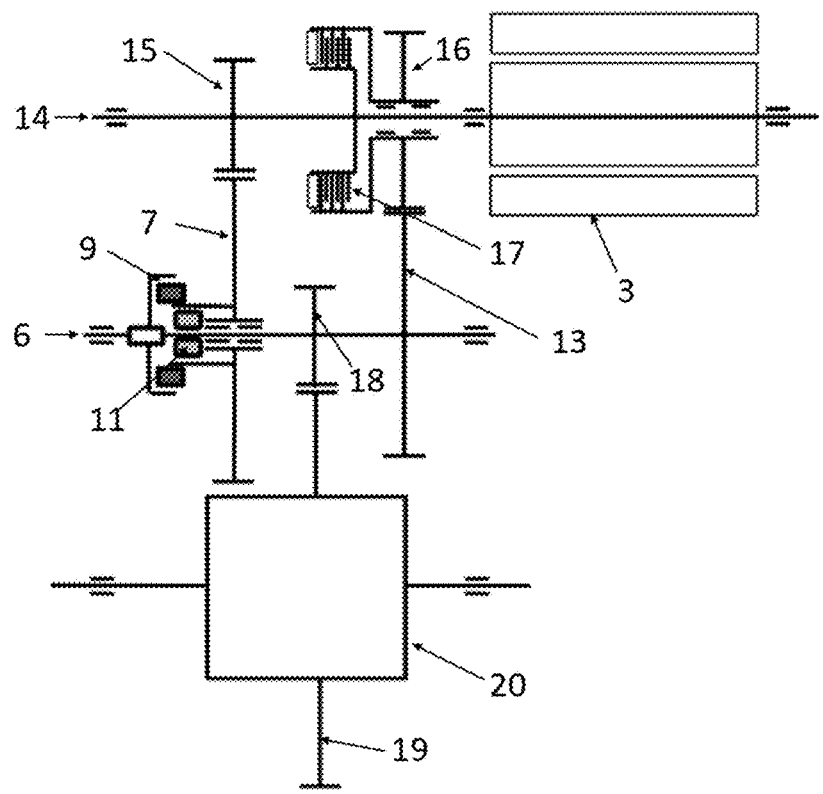
FIG. 10 illustrates a schematic depiction of the kinematic chain of the transmission mechanism according to a fourth embodiment of the invention.

In the fourth embodiment, illustrated in FIG. 10:
the second shaft 14 is rotated by the output shaft of an electric drive machine 3;
the first driven wheel 7 and the third driven wheel 15 are situated on the left;
the second driven wheel 13 and the fourth driven wheel 16 are situated on the right;
the fifth driven wheel 18 is situated axially between the first driven wheel 7 and the second driven wheel 13;
the switching mechanism 9 and the freewheel device 11 are situated on the left-hand side;
the friction clutch 17 is situated on the left-hand side.

Figure 11:
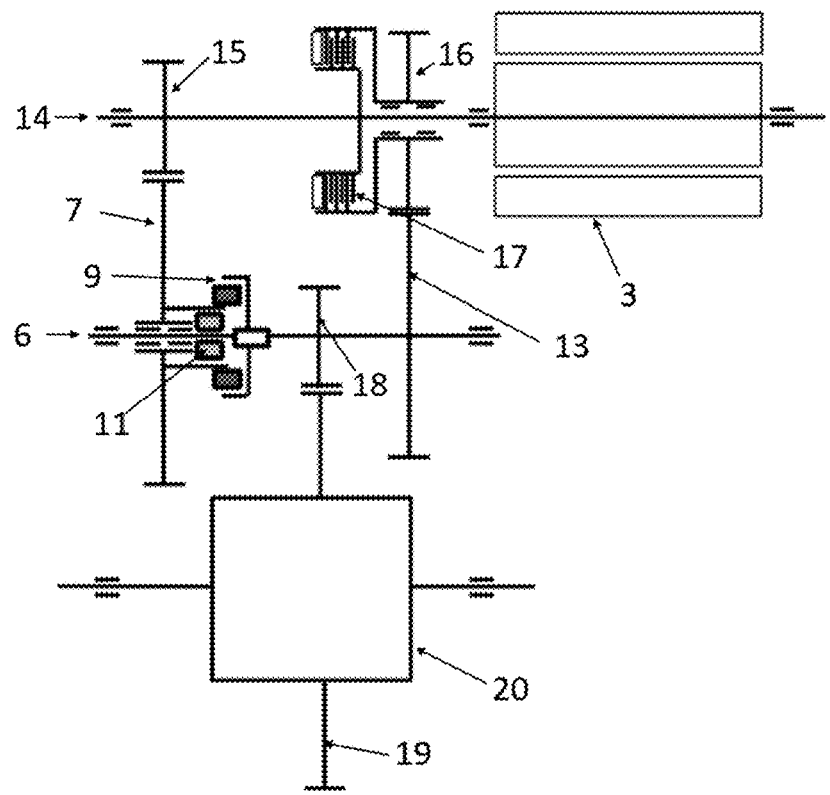
FIG. 11 illustrates a schematic depiction of the kinematic chain of the transmission mechanism according to a fifth embodiment of the invention.

In the fifth embodiment, illustrated in FIG. 11:
the second shaft 14 is rotated by the output shaft of an electric drive machine 3;
the first driven wheel 7 and the third driven wheel 15 are situated on the left;
the second driven wheel 13 and the fourth driven wheel 16 are situated on the right;
the fifth driven wheel 18 is situated axially between the first driven wheel 7 and the second driven wheel 13;
the switching mechanism 9 and the freewheel device 11 are situated on the right-hand side;
the friction clutch 17 is situated on the left-hand side.

Figure 12:
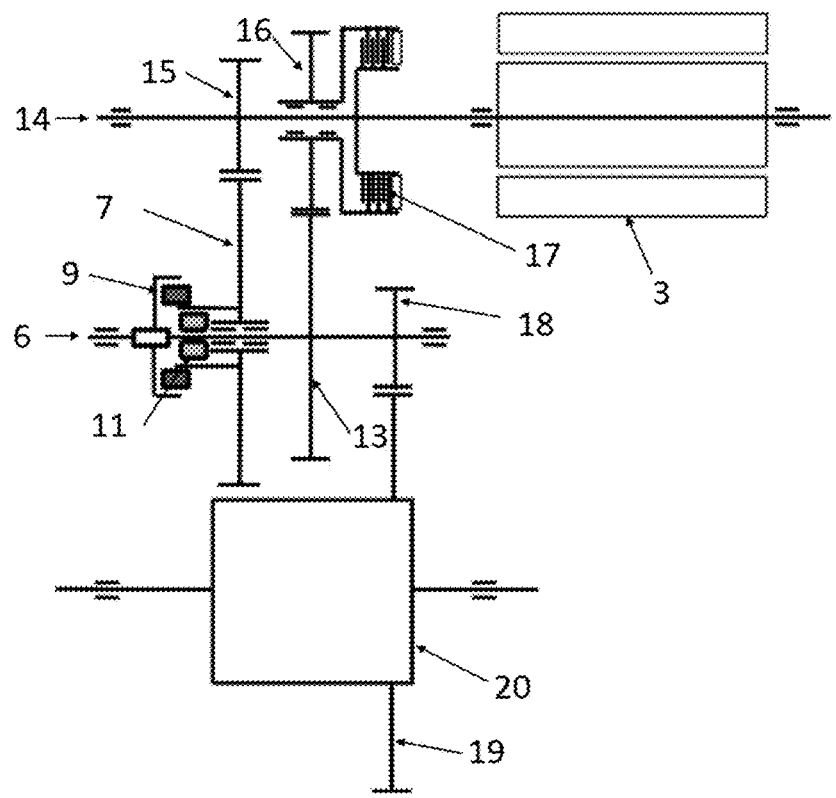
FIG. 12 illustrates a schematic depiction of the kinematic chain of the transmission mechanism according to a sixth embodiment of the invention.

In the sixth embodiment, illustrated in FIG. 12:
the second shaft 14 is rotated by the output shaft of an electric drive machine 3;
the first driven wheel 7 and the third driven wheel 15 are situated on the left;
the fourth driven wheel 16 is situated on the right;
the fifth driven wheel 18 is situated on the right;

the second driven wheel 13 is situated axially between the first driven wheel 7 and the fifth driven wheel 18;
the switching mechanism 9 and the freewheel device 11 are situated on the left-hand side;
the friction clutch 17 is situated on the right-hand side.

Figure 13:
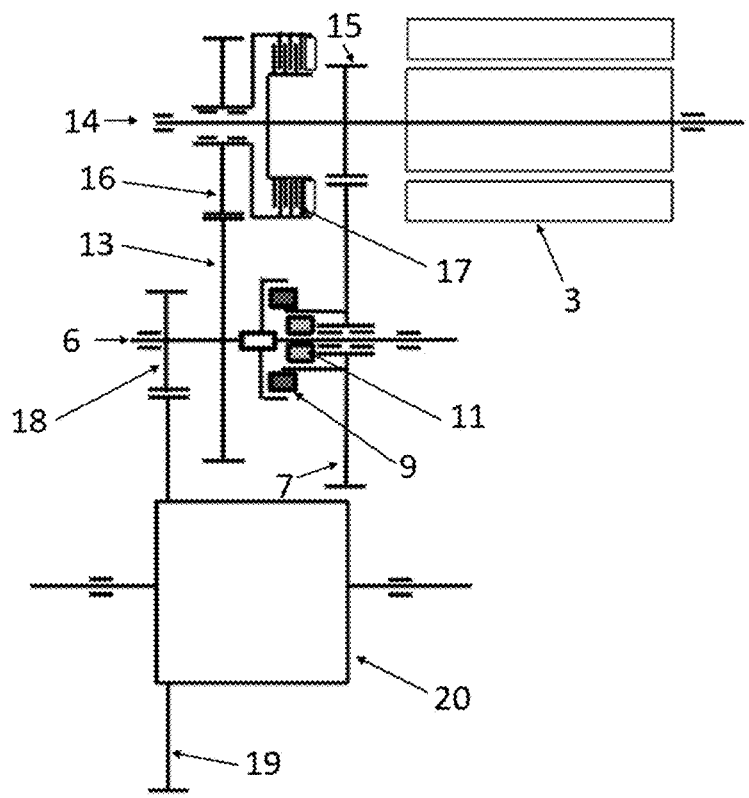
FIG. 13 illustrates a schematic depiction of the kinematic chain of the transmission mechanism according to a seventh embodiment of the invention.

In the seventh embodiment, illustrated in FIG. 13:
the second shaft 14 is rotated by the output shaft of an electric drive machine 3;
the first driven wheel 7 and the third driven wheel 15 are situated on the right;
the fourth driven wheel 16 is situated on the left;
the fifth driven wheel 18 is situated on the left;
the second driven wheel 13 is situated axially between the first driven wheel 7 and the fifth driven wheel 18;
the switching mechanism 9 and the freewheel device 11 are situated on the left-hand side;
the friction clutch 17 is situated on the right-hand side.

Figure 14:
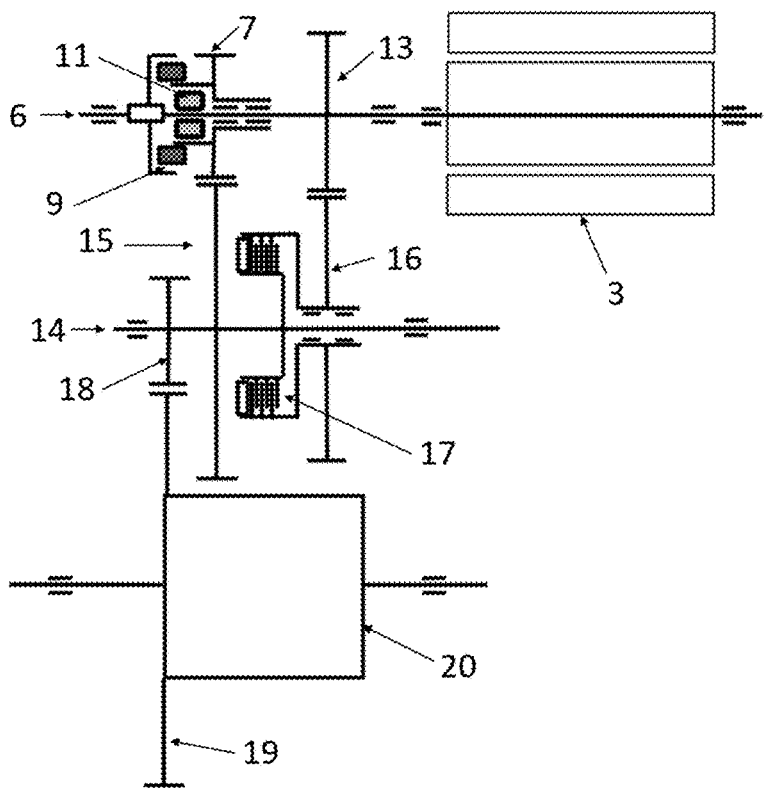
FIG. 14 illustrates a schematic depiction of the kinematic chain of the transmission mechanism according to an eighth embodiment of the invention.

In the eighth embodiment, illustrated in FIG. 14:
the first shaft 6 is rotated by the output shaft of an electric drive machine 3;
the second driven wheel 13 and the fourth driven wheel 16 are situated on the right;
the first driven wheel 7 is situated on the left;
the fifth driven wheel 18 is situated on the left;
the third driven wheel 15 is situated axially between the fourth driven wheel 16 and the fifth driven wheel 18;
the switching mechanism 9 and the freewheel device 11 are situated on the left-hand side;
the friction clutch 17 is situated on the left-hand side.

Figure 15:
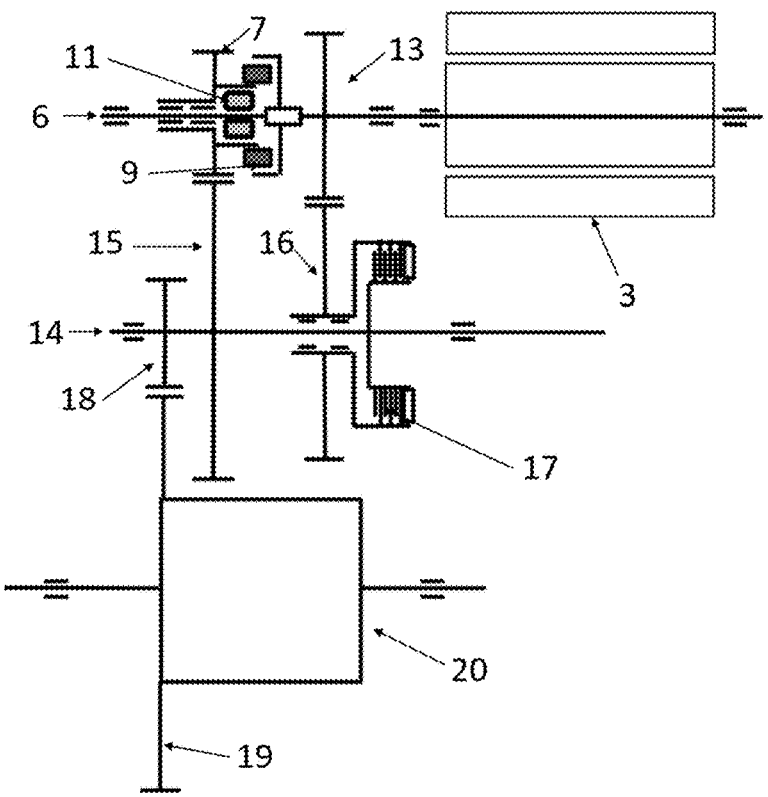
FIG. 15 illustrates a schematic depiction of the kinematic chain of the transmission mechanism according to a ninth embodiment of the invention.

In the ninth embodiment, illustrated in FIG. 15:
the first shaft 6 is rotated by the output shaft of an electric drive machine 3;
the second driven wheel 13 and the fourth driven wheel 16 are situated on the right;
the first driven wheel 7 is situated on the left;
the fifth driven wheel 18 is situated on the left;
the third driven wheel 15 is situated axially between the fourth driven wheel 16 and the fifth driven wheel 18;
the switching mechanism 9 and the freewheel device 11 are situated on the right-hand side;
the friction clutch 17 is situated on the right-hand side.

It must be noted that all of the features, as they appear to a person skilled in the art on the basis of the present description, the drawings and the accompanying claims, even if in practice they have only been described in relation to other given features, both individually and according to any combination, may be combined with other features or groups of features disclosed herein, provided that this has not been expressly excluded and that technical circumstances do not make such combinations impossible or pointless.

The invention claimed is:

1. A transmission mechanism for a gearbox with a plurality of gears, the transmission mechanism comprising:
a first shaft having a first axis of rotation;
a first driven wheel, in a form of a gear, coaxial with the first axis of rotation and rotatably guided on the first shaft, the first driven wheel comprising first teeth extending radially;
a switching mechanism movable between at least a first engaged position and a second disengaged position, said switching mechanism comprising second teeth that rotatably interact with the first teeth in the first engaged position and do not rotatably interact with the first teeth in the second disengaged position, the second teeth extending axially; and
a freewheel device comprising a locking member rotatably interacting directly or indirectly with the first shaft, and rotatably interacting directly or indirectly with the first driven wheel;
the first teeth and the second teeth at least partially axially covering the locking member in the first engaged position,
wherein the first driven wheel comprises an extension portion which extends axially, the extension portion including a radially inner surface which rotatably interacts with a radially outer part of the locking member, and a radially outer surface bearing the first teeth, the radially inner surface of the extension portion being radially outward of gear teeth of the first driven wheel, and an axial length of the extension portion being greater than or equal to an axial length of the locking member.

2. The transmission member according to claim 1, wherein the locking member comprises a radially inner part that rotatably interacts, directly or via an inner ring, with the first shaft, and the radially outer part that rotatably interacts, directly or via an outer ring, with the first driven wheel.

3. The transmission mechanism according to claim 2, wherein the first teeth and the second teeth axially cover 20 to 100% of the axial length of the locking member in the first engaged position.

4. The transmission mechanism according to claim 2, wherein the switching mechanism is a dog clutch, the second teeth being inserted axially by cooperation of shapes into the first teeth during transition from the second disengaged position to the first engaged position.

5. The transmission mechanism according to claim 2, wherein the locking member comprises a set of rollers or sprags or pawls.

6. The transmission mechanism according to claim 2, further comprising:
a second driven wheel coaxial with the first axis of rotation and rotatably fixed on the first shaft;
a second shaft having a second axis of rotation parallel to the first axis of rotation;
a third driven wheel coaxial with the second axis of rotation, rotatably fixed on the second shaft and rotatably interacting with the first driven wheel to form a first speed reduction ratio between the first shaft and the second shaft;
a fourth driven wheel coaxial with the second axis of rotation, rotatably guided on the second shaft and rotatably interacting with the second driven wheel to form a second speed reduction ratio between the first shaft and the second shaft; and
a friction clutch comprising a plurality of friction discs, coaxial with the second axis of rotation, the friction clutch being capable of rotatably coupling and uncoupling the fourth driven wheel and the second shaft.

7. The transmission mechanism according to claim 2, further comprising:
a fifth driven wheel rotatably fixed on the second shaft;
a third axis of rotation parallel to the second axis of rotation;
a sixth driven wheel coaxial with the third axis of rotation and rotatably interacting with the fifth driven wheel to form a third speed reduction ratio; and
a differential mechanism fixed on the sixth driven wheel.

8. The transmission mechanism according to claim 1, wherein the first teeth and the second teeth axially cover 20 to 100% of the axial length of the locking member in the first engaged position.

9. The transmission mechanism according to claim 1, wherein the switching mechanism is a dog clutch, the second teeth being inserted axially by cooperation of shapes into the first teeth during transition from the second disengaged position to the first engaged position.

10. The transmission mechanism according to claim 1, wherein the locking member comprises a set of rollers or sprags or pawls.

11. The transmission mechanism according to claim 1, further comprising:
   a second driven wheel coaxial with the first axis of rotation and rotatably fixed on the first shaft;
   a second shaft having a second axis of rotation parallel to the first axis of rotation;
   a third driven wheel coaxial with the second axis of rotation, rotatably fixed on the second shaft and rotatably interacting with the first driven wheel to form a first speed reduction ratio between the first shaft and the second shaft;
   a fourth driven wheel coaxial with the second axis of rotation, rotatably guided on the second shaft and rotatably interacting with the second driven wheel to form a second speed reduction ratio between the first shaft and the second shaft; and
   a friction clutch comprising a plurality of friction discs, coaxial with the second axis of rotation, the friction clutch being capable of rotatably coupling and uncoupling the fourth driven wheel and the second shaft.

12. The transmission mechanism according to claim 11, wherein the first speed reduction ratio is greater than the second speed reduction ratio.

13. The transmission mechanism according to claim 1, further comprising:
   a fifth driven wheel rotatably fixed on the second shaft;
   a third axis of rotation parallel to the second axis of rotation;
   a sixth driven wheel coaxial with the third axis of rotation and rotatably interacting with the fifth driven wheel to form a third speed reduction ratio; and
   a differential mechanism fixed on the sixth driven wheel.

14. The transmission mechanism according to claim 13, wherein the first driven wheel and the third driven wheel are gears, and/or the second driven wheel and the fourth driven wheel are gears, and/or the fifth driven wheel and the sixth driven wheel are gears.

15. The transmission mechanism according to claim 13, wherein the first shaft is capable of being rotated by an output shaft of an electric drive machine.

16. The transmission mechanism according to claim 1, further comprising:
   a fifth driven wheel rotatably fixed on the first shaft;
   a third axis of rotation parallel to the second axis of rotation;
   a sixth driven wheel coaxial with the third axis of rotation and rotatably interacting with the fifth driven wheel to form a third speed reduction ratio; and
   a differential mechanism fixed on the sixth driven wheel.

17. The transmission mechanism according to claim 16, wherein the first driven wheel and the third driven wheel are gears, and/or the second driven wheel and the fourth driven wheel are gears, and/or the fifth driven wheel and the sixth driven wheel are gears.

18. The transmission mechanism according to claim 16, wherein the second shaft is capable of being rotated by an output shaft of an electric drive machine.

19. A two-speed gearbox for a vehicle, capable of interacting with an electric drive machine, comprising a transmission mechanism according to claim 1.

20. A powertrain comprising a gearbox according to claim 19 and an electric drive machine.

* * * * *